Dec. 11, 1956

T. L. THOMPSON ET AL 2,773,494

FISHING LINE CASTING GUNS

Filed July 6, 1953

Dec. 11, 1956  T. L. THOMPSON ET AL  2,773,494
FISHING LINE CASTING GUNS

Filed July 6, 1953  2 Sheets-Sheet 2

United States Patent Office 2,773,494
Patented Dec. 11, 1956

2,773,494

FISHING LINE CASTING GUNS

Theodore Lester Thompson and Bernadine G. Thompson, Anaconda, Mont.

Application July 6, 1953, Serial No. 366,253

2 Claims. (Cl. 124—15)

This invention is a device to be used by fishermen in making casts.

The object being to provide a casting gun or device by which the fisherman can cast long distances with little effort.

A further object is to provide the inexpert fisherman with a device by which he can cast farther and with good accuracy.

A further object being to provide a casting gun or device of simple construction so that it may be assembled or taken apart by even the novice.

A further object being to provide a casting gun or device that is safe for fishermen to use.

A further object being to provide a casting gun or device constructed similar in shape and appearance to a fishing pole handle, and therefore more convenient to use.

An object is to provide a casting gun or device that expels or shoots from the barrel of said casting gun or device, a slug or sinker propelled by air pressure, thereby reducing possible mechanical failures.

Another object is to provide a casting gun or device that is attachable to the standard spinning reel and also fishing pole tips, thus forming a casting gun or device and fish pole and reel for use in combination for the fisherman's convenience.

Another object is to provide a casting gun or device of adjustable power stages to be of use in casting varied distances.

As illustrative of our invention but without limiting it, the attached drawing shows a now favored embodiment of our idea:

Figure 1:
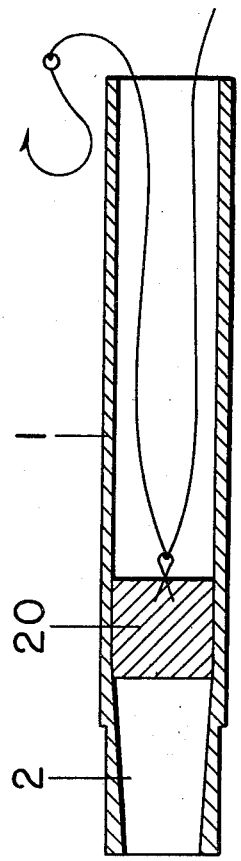
Figure 1 is an enlarged detailed view of the barrel, 1 and 2 and also of the projectile 20 used as a bait or lure and line carrying medium.

Referring now to Figure 1, this part is the cylindrical barrel 1 and 2 of the casting gun or device. The barrel 1 and 2 is shown with projectile inserted, so as to better illustrate the novel design of the barrel 1 and 2. As can readily be seen in Figure 1, the barrel 1 and 2 is of smooth bore and of even internal dimensions from the muzzle, or forward end, rearward for the greater part of the length of the barrel. As will also be noted in Figure 1, said barrel, 1 and 2, is tapered or constricted internally in the rearward end of said barrel. This taper or constriction of the rearward end of said barrel, 1 and 2, is noted as 2 in Figure 1, drawing of said barrel. Also noted in Figure 1 is the cylindrical shaped projectile 20, used as a bait or lure and line carrying medium when shot or expelled from barrel 1 and 2. The cylindrical shaped projectile 20 is fitted with a loop on one end, the purpose of said loop being to fasten projectile 20 to the fish line and bait or lures. When the projectile 20 is inserted in the barrel 1 and 2 and the projectile 20 is a snug fit in the forward or muzzle end of barrel 1 and 2 and the projectile 20 is forced rearward into taper 2 of said barrel, said projectile 20 is held by the friction of taper 2 in said barrel 1 and 2 until maximum air pressure is attained in air chamber 4, Figure 3. When full air pressure is attained in air chamber 4, projectile 20 is forced from taper 2, and so expelled from said barrel with maximum force. Said tapered barrel 1 and 2 being of great importance in the operation of said casting gun or device.

Figure 3:
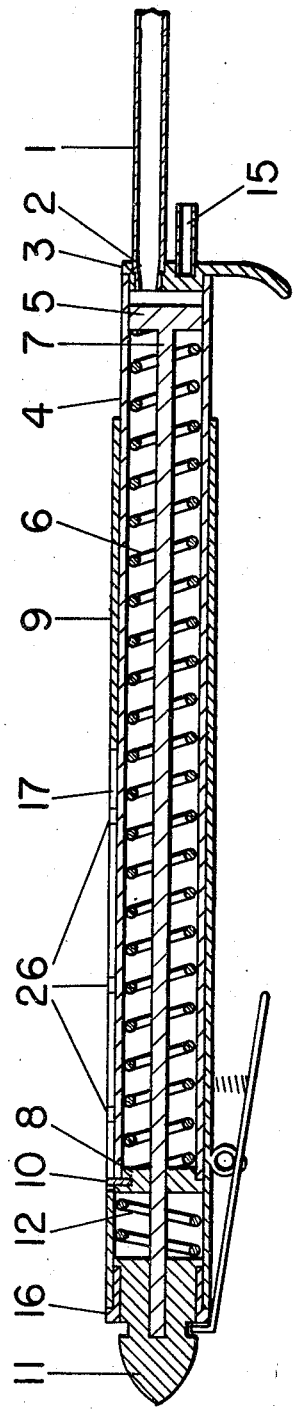
Figure 3 is a longitudinal section shown in detail of the complete device.

As shown in Figure 3, 3 represents a member which connects the barrel 1 and 2 to the cylindrical air chamber 4. Member 3 also contains a socket 15, into which a fish pole tip may be fitted.

4 is the cylindrical air chamber, it also is a housing for the piston 5, the compression spring 6, and the piston shaft 7.

8 is a member fitted into the rearward end of the air chamber 4. Member 8 has a hole through the center of it to allow shaft 7 to move through said hole, thereby holding shaft 7 in center of air chamber 4. Member 8 also serves to hold compression spring 6 in air chamber 4.

9 is a cylindrical sleeve fitted to slide over air chamber 4. Sleeve 9 acts as a means of compressing spring 6, and sleeve 9 having a slot 17 longitudinally and smaller slots 26 laterally, to hold sleeve 9 in set position by means of a pin 10 fitted into member 8 and engaging slot 17 and slot 26. Reel mountings may be mounted to forward end of sleeve 9.

12 is a small compression spring fitted over shaft 7 and mounted between member 8 and trigger lock 11. The spring 12 acts as a shock absorber for the piston 5, and shaft 7 assembly, to prevent piston 5 from striking member 3 at end of stroke, and thereby preventing damage to said piston 5.

16 is a member fitted into the rearward end of sleeve 9. Member 16 has a hole through the center, into which the trigger lock 11 is held by trigger 13 when casting gun or device is set for casting.

Figure 4:
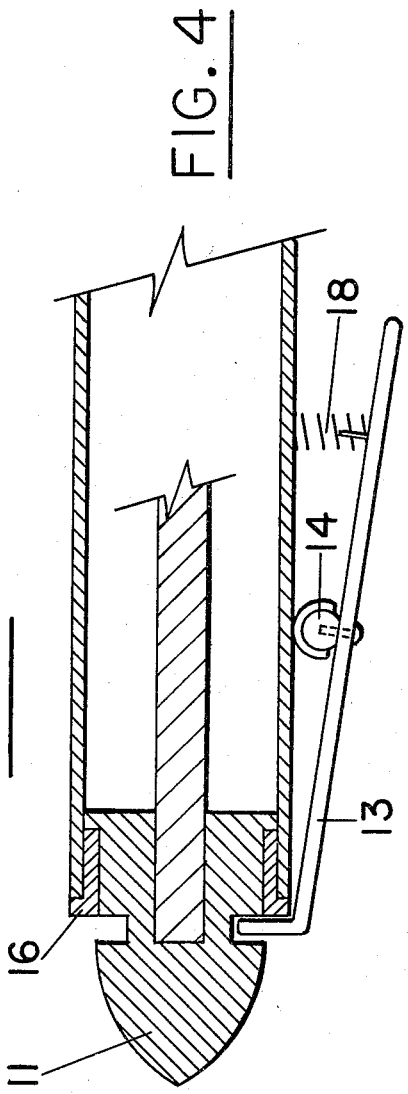
Figure 4 is an enlarged detail view of the trigger structure.

The trigger lock 11 is a member fitted to shaft 7. Trigger lock 11 has a groove encircling same, into which the trigger 13 engages to lock said trigger lock 11 into member 16. As can be noted in Figure 3, when sleeve 9 fitted to member 16 is pulled rearward of air chamber 4 and trigger 13 is locked into the groove of trigger lock 11, shaft 7 and piston 5 are pulled rearward in air chamber 4 and thus compressing spring 6. Trigger lock 11 also has a shoulder to limit entry into member 16 so the groove is in position to engage the trigger. Also trigger lock 11 is rounded on rearward end, to cause easy entry into member 16 to re-set trigger assembly, Figure 4.

Trigger 13 is a member formed to fit longitudinally along sleeve 9 and also formed to fit over the rearward end of sleeve 9 and member 16 to engage in groove of trigger lock 11. Trigger 13 is fitted to hinge 14, and hinge 14 being fitted to sleeve 9. As can be seen in Figure 3, when the forward part of trigger 13 is pressed, the leverage of the forward part of trigger 13 over hinge 14 will lift the rearward part of trigger 13 out of the groove in trigger lock 11, thus allowing trigger lock 11 to slip through member 16, thus allowing compression spring 6 to force shaft 7 and piston 5 forward and thus operating the casting gun or device.

As can be seen in Figure 3, 18 is a small compression spring mounted between trigger 13 and sleeve 9. A small pin fixed to sleeve 9 holds spring 18 in place. The purpose of spring 18 is to hold trigger 13 in set position, except when the forward part of trigger 13 is pressed to operate said casting gun or device.

Figure 2:
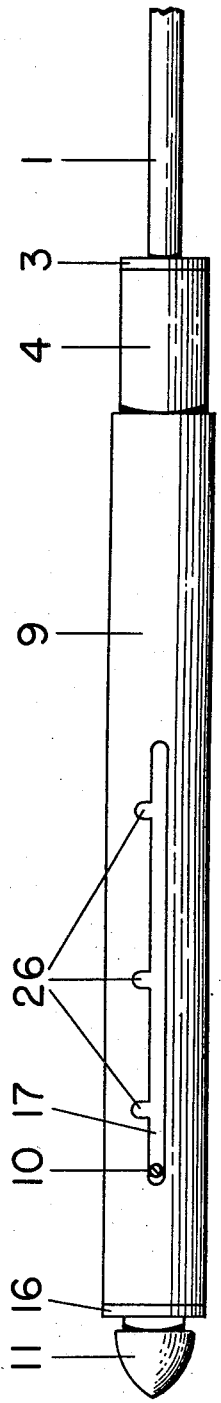
Figure 2 is a plan view looking down.

To operate the casting gun or device, a bait or lure and line carrying projectile 20 is inserted into barrel 1 and 2, as in Figure 1, projectile 20 being forced into rearward end of barrel 1 and 2, where the projectile is held in taper 2 of barrel 1 and 2, by the friction of said taper. The forward part of air chamber 4 is held by one hand and sleeve 9 is pulled rearward with the other hand. The trigger 13 being engaged into the groove of trigger lock 11, shaft 7 and piston 5 are pulled rearward with sleeve 9, thereby compressing spring 6 in air chamber 4. Sleeve 9 is then locked in the desired position by means of the pin 10 and slots 26, as shown in Figure 2. Pin 10 being fitted to member 8 engages slot 17 longitudinally in sleeve 9 and smaller slots 26 laterally from the slot 17. As may be seen in Figure 2 when the sleeve 9 is pulled rearward and turned, engaging the pin 10 in the chosen lateral slot 26, the sleeve 9 may be set in the chosen position, thereby compressing spring 6 to the desired tension of the user. Said casting gun or device is aimed and the forward part of trigger 13 is pressed, disengaging the rearward part of trigger 13 from the groove of trigger lock 11, thus allowing trigger lock 11 to slip through member 16 thus releasing shaft 7 and piston 5, the spring 6 forcing said shaft 7 and piston 5 forward in air chamber 4, said piston 5 compressing air in the forward part of air chamber 4. When the said air pressure becomes greater than the force caused by the friction of taper 2 in barrel 1 and 2, holding projectile 20 in said barrel 1 and 2, projectile 20 is forced by said air pressure from said barrel 1 and 2, thus making the cast. To reset, the sleeve 9 is pushed forward, engaging trigger 13 and trigger lock 11, and the operation repeated.

While we have described a casting gun or device, we do not wish to limit ourselves to the precise details set forth; we wish to be free to make alterations as may fall within the spirit and scope of the invention, as claimed.

We claim as new:

1. A fishing line casting gun comprising an air chamber, a sleeve fitted over said air chamber and being rotatable and longitudinally movable thereon, a piston in said air chamber, a shaft engaging said piston, a spring carried by said shaft and engaging said piston, a trigger lock carried by one end of said shaft and having sliding movement longitudinally of said sleeve, a spring abutment carried in said air chamber and engaged by one end of said spring, said sleeve having a longitudinal slot, said sleeve also having spaced lateral slots communicating with said longitudinal slot, a pin carried by said air chamber and adapted to travel in said longitudinal slot and adapted to selectively fit into said lateral slots as said sleeve is moved longitudinally of and rotated upon said air chamber to hold said sleeve in a selected adjusted position on said air chamber, a barrel communicating with said air chamber and projecting therefrom, said barrel having a tapered portion at its inner end, a projectile frictionally fitting in said inner end, a fishing line connected to said projectile and extending longitudinally of the barrel, the barrel having an outer end through which the line extends, and means carried by the air chamber adjacent the barrel for supporting a fishing rod to which said line is attached, said sleeve adapted to compress said spring and retract said piston within said air chamber when said sleeve is moved longitudinally of said air chamber, a spring-pressed trigger on said sleeve releasably engaging said trigger lock to hold the trigger lock in a set position until said trigger is released, and said spring being adapted to expand when said sleeve is released for free sliding movement upon said air chamber to drive said piston toward said barrel and to thereby eject said projectile from said barrel.

2. A fishing line casting gun comprising an air chamber, a sleeve slidable thereon, a projectile carrying barrel communicating with said air chamber, a piston in said air chamber, a shaft connected to said piston, a fixed abutment in said air chamber, a compressible expansion spring in said chamber engaging said piston and having abutting engagement with said fixed abutment for driving said piston toward said barrel to eject a projectile therefrom, a trigger lock carried by one end of said shaft having sliding movement longitudinally of said sleeve, a shock absorbing spring engaging said trigger lock, said fixed abutment in said air chamber abutting one end of said shock absorbing spring, said shock absorbing spring being adapted to take up shock and limit the movement of said piston in one direction, means for holding said sleeve in a selected position upon said air chamber, a spring pressed trigger pivoted on said sleeve and releasably engaging said trigger lock to hold the trigger lock in a set position until said trigger is released, said trigger lock having a tapering outer end and a groove encircling the trigger lock to facilitate the automatic engagement of the trigger lock with said trigger as said shaft is moved longitudinally of said air chamber, and a member carried by said sleeve for limiting the movement of said trigger lock in one direction within said sleeve.

References Cited in the file of this patent

UNITED STATES PATENTS

| | | |
|---|---|---|
| 190,893 | O'Conner et al. | May 15, 1877 |
| 729,444 | Strasser | May 26, 1903 |
| 1,250,523 | Settles | Dec. 18, 1917 |
| 1,486,807 | Skala | Mar. 11, 1924 |
| 2,069,821 | Douglas | Feb. 9, 1937 |
| 2,587,687 | Beyers | Mar. 4, 1952 |